2

United States Patent Office 3,655,823
Patented Apr. 11, 1972

3,655,823
NOVEL MIXTURES OF ACRYLIC MONOMERS AND POLYESTER RESINS
Earl E. Parker, Allison Park, and Roger M. Christenson and Rostyslaw Dowbenko, Gibsonia, Pa., assignors to PPG Industries, Inc., Pittsburgh, Pa.
No Drawing. Filed Nov. 6, 1969, Ser. No. 874,720
Int. Cl. C08f 21/00, 21/02
U.S. Cl. 260—872                                7 Claims

ABSTRACT OF THE DISCLOSURE

Novel mixtures of acryloxypivalyl acryloxypivalate and analogous compounds with polyesters are copolymerized by actinic light, free-radical catalysis or radiation curing. The resulting copolymer is a hard, mar-resistant, and relatively flexible material.

---

This invention, in general, deals with novel mixtures which are highly radiation-sensitive. The novel mixtures when subjected to low doses of ionizing irradiation or to actinic light or to free-radical catalysts copolymerize to form extremely strong, stain-resistant materials. These cured materials show excellent resistance to the most stringent staining tests and are scratch-resistant, mar-resistant, and relatively flexible.

In our copending application Ser. No. 820,672, filed Apr. 30, 1969, it was disclosed that polymers of outstanding properties are obtained by polymerizing acrylic monomers formed by the reaction of acidic acrylic compounds such as acrylic acid and methacrylic acid with diols having the general formula:

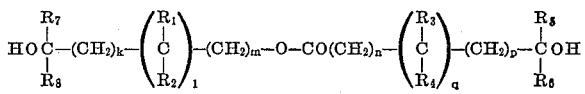

wherein $R_1$, $R_2$ and $R_3$ and $R_4$ are selected from the group consisting essentially of H, alkyl, aryl, and cycloalkyl, substituted alkyl, substituted aryl, and substituted cycloalkyl groups, $R_5$, $R_6$, $R_7$, and $R_8$ are selected from the group consisting of H, alkyl, aryl, and cycloalkyl; and $k$, $l$, $m$, $n$, $q$ and $p$ are whole numbers having values from 0 to 5.

It has now been discovered that the above acrylic monomers when mixed with polyester resins may be copolymerized to form copolymers having the outstanding properties of the acrylic polymers described in U.S. application Ser. No. 820,672 and have the advantage of being more flexible than the polymers described in the aforementioned application. This increased flexibility greatly improves the desirability of the product and broadens the utility thereof.

The novel mixtures produced in accordance with this invention comprise a mixture of (1) the acrylic compounds described in copending U.S. application Ser. No. 820,672 and (2) polyesters which are compatible with the compound (1).

By the term "compatible," it is meant that the uncured acrylic compound and polyester form a true solution.

The acrylic compounds (1) are those compounds having the formula

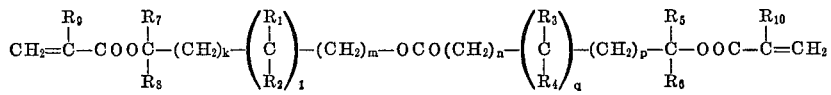

wherein $R_1$, $R_2$, $R_3$, and $R_4$ are selected from the group consisting of H, alkyl, aryl, and cycloalkyl, substituted alkyl, substituted aryl and substituted cycloalkyl groups. The alkyl groups may be of any length but the preferred alkyl radicals contain from 1 to 8 carbon atoms such as methyl, ethyl, isopropyl, hexyl, octyl, and the like. The preferred cycloalkyl groups contain from 5 to 8 carbon atoms such as cyclopentyl, cyclohexyl, cycloheptyl and cyclooctyl. The preferred aryl groups contain up to 8 carbon atoms such as phenyl, benzyl, and the like. The alkyl, cycloalkyl and aryl radicals may also be substituted with halogens, hydroxyls, etc. Examples of these radicals are chloropropyl, bromobenzyl, chlorocyclopentyl, hydroxyethyl, chlorooctyl, chlorophenyl, bromophenyl, hydroxyphenyl, and the like.

The radicals $R_5$, $R_6$, $R_7$ and $R_8$ are selected from the group consisting of H, alkyl, aryl, and cycloalkyl. Examples of the alkyl, cycloalkyl, and aryl radicals which may apply are given above under the discussion of $R_1$, $R_2$, $R_3$, and $R_4$.

The radicals $R_9$ and $R_{10}$ are selected from the group consisting of H, alkyl groups containing from 1 to 2 carbon atoms, halo-substituted alkyl groups containing from 1 to 2 carbon atoms, and halogen. Examples are methyl, ethyl, bromoethyl, and chlorine.

Although $R_1$, $R_2$, $R_3$, $R_4$, $R_5$, $R_6$, $R_7$, $R_8$, $R_9$ and $R_{10}$ may be the same radicals, each one of them may be different from the other as long as they fall under the general definition for each. That is to say, that while $R_1$ and $R_2$ may be H, $R_3$ may be ethyl, $R_4$ may be pentyl, $R_5$ and $R_6$ may be cyclohexyl, etc.

Subscripts $k$, $l$, $m$, $n$, $q$ and $p$ are whole numbers having values from 0 to 5.

The preferred compounds are those that contain the neopentyl type structures, for example, those wherein $R_1$, $R_2$, $R_3$ and $R_4$ are lower alkyl groups, such as methyl, ethyl and propyl, and $R_5$, $R_6$, $R_7$, and $R_8$ are H, and $p$ and $k$ are 0, $l$ and $q$ are 1, and $m$ and $n$ have values of 1 or 2. It has been found that these compounds exhibit the most durable and weather-resistant properties.

The most preferable compound having this structure is acryloxypivalyl acryloxypivalate, in which $R_1$, $R_2$, $R_3$, $R_4$ are $CH_3$ radicals and $R_5$, $R_6$, $R_7$, $R_8$, $R_9$, and $R_{10}$ are H and $m$, $l$, and $q$ are 1 and $k$, $n$ and $p$ are 0.

Examples of other compounds having the above structures are methacryloxypivalyl methacryloxypivalate where $R_1$, $R_2$, $R_3$, $R_4$, $R_9$, and $R_{10}$ are $CH_3$ radicals and $R_5$, $R_6$, $R_7$, and $R_8$ are H and $l$, $m$, and $q$ are 1 and $k$, $n$, and $p$ are 0, 4-acryloxybutyl 4-acryloxybutyrate where $R_1$ to $R_{10}$ are H and $l$ and $q$ are 1, $k$ and $p$ are 2 and $m$ and $n$ are 0, acryloxypivalyl 4-acryloxybutyrate where $R_5$ to $R_{10}$ are H, $R_1$ and $R_2$ are $CH_3$. $k$ and $q$ are 0, $l$, $m$ and $p$ are 1 and $n$ is 2, 2-acryloxyethyl acryloxypivalate where $R_5$ to $R_{10}$ are H and $R_3$ and $R_4$ are $CH_3$. $k$ and $q$ are 1 and $l$, $m$, $n$, and $p$ are 0.

It is noted that mixtures of any two or more of the above compounds are also intended to be included by the above formula The polyester may be any unsaturated polyester which is compatible with the acrylic compound (1).

The polyesters are ordinarily mixtures of (A) a polyester of an alpha-beta ethylenically unsaturated polycarboxylic acid and (B) a polyhydric alcohol.

The ethylenically unsaturated polycarboxylic acids include such acids as:
maleic acid            mesaconic acid
fumaric acid           citraconic acid
aconitic acid          itaconic acid and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:

| | |
|---|---|
| ethylene glycol | polypropylene glycol |
| diethylene glycol | glycerol |
| triethylene glycol | neopentyl glycol |
| polyethylene glycol | pentaerythritol |
| propylene glycol | trimethylol propane |
| dipropylene glycol | trimethylol ethane | and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional cross-linking sites, which is a desired feature in some polyesters. Examples of useful dicarboxylic acids which are either saturated or only aromatically unsaturated include:

| | |
|---|---|
| succinic acid | phthalic acid |
| adipic acid | isophthalic acid |
| suberic acid | terephthalic acid |
| azelaic acid | tetrachlorophthalic acid |
| sebacic acid | | and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:

| | |
|---|---|
| styrene | hexyl acrylate |
| alpha-methylstyrene | octyl acrylate |
| divinylbenzene | octyl methacrylate |
| diallyl phthalate | diallyl itaconate |
| methyl acrylate | diallyl maleate |
| methyl methacrylate | | and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer. At the preferred range, the monomer is present in an amount of about 20 percent to about 50 percent.

Since the polyester component of the interpolymerizable mixture is often highly viscous or even solid at ambient temperatures, it is preferred to add the vinyl monomer thereto at a temperature sufficient to render the polyester satisfactorily fluid for incorporation with the vinyl monomer. This temperature is usually in the range of about 100° C. to about 120° C., which is sufficiently high, in the absence of gelation inhibitors, to induce premature gelation upon introduction of the monomer into the system. This is true even in the absence of free-radical catalysts.

Examples of inhibitors which may be used to prevent premature gelation are p-benzoquinone, chloranil, hydroquinone, 3-isopropyl catechol, 3-methyl catechol, trimethyl amine hydrochloride, N-benzylaniline hydrochloride, trimethylbenzylammonium acid oxalate, trimethylbenzylammonium maleate, trimethylbenzylammonium chloride, and the like. The inhibitor is generally used in a range of about 0.001 percent to about 0.1 percent by weight based upon the polyester component of the mixture.

The preferred polyesters are made from the condensation product of maleic acid and neopentyl glycol or 1,6-hexane diol along with saturated dicarboxylic acids such as adipic acid or hexahydrophthalic anhydride.

The novel mixtures of acrylic monomers and polyesters may contain any proportion of the two components but the mixture generally comprises from 5 to about 85 percent by weight of the polyester. It is noted that even very small amounts of polyester when added to the acrylic compound aid in the flexibilizing of the resulting copolymer. The mixture generally comprises from about 5 to about 95 percent by weight of the acrylic monomer. Preferably, the mixture contains from 50 to 75 percent of the acrylic monomer and from 25 to 50 percent of the polyester.

The use of additional monomers with the novel mixtures of this invention is optional. It is, however, desirable in many instances to add the vinyl monomers which crosslink with the unsaturated polyesters such as those described above and other interpolymerizable ethylenically unsaturated monomers such as acrylic monomers as alkyl acrylates and alkyl methacrylates to obtain desired properties. These vinyl ethylenically unsaturated monomers may be interpolymerized with the novel mixtures of this invention and cured either by free-radical catalysis, ultraviolet light, or ionizing irradiation. In the preferred embodiments, the additional monomer is 2-ethyl hexyl acrylate, styrene, or butyl acrylate and is added in quantities not exceeding 50 percent by weight of the mixture.

As the mixtures prepared in this manner are extremely radiation-sensitive, and since radiation-sensitivity is both difficult to achieve and to predict, a feature of this invention is to interpolymerize the mixtures herein by subjecting them to ionizing irradiation.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The mixtures described herein will copolymerize acceptably using any total dosage between about 0.2 megarad and about 20 megarads. A "rad" is defined as that amount of radiation required to supply 100 ergs per gram of material being treated, and a "megarad" is $10^6$ rads. The total dosage is the total amount of irradiation received by the mixtures. It has been found that the mixtures of this invention will polymerize to hard, mar-resistant and stain-resistant films at a total dosage of less than 2 megarads. The preferable total dosage used is from about 0.5 megarad to about 10 megarads.

The mixtures of this invention may also be polymerized and cured by a free-radical mechanism where free-radical catalysts are added and the materials are heated to polymerize. Any conventional free-radical catalyst may be used such as organic peroxides, organic hydroperoxides, or esters thereof. Examples are benzoyl peroxide, tertiary-butyl perbenzoate, tertiary-butyl hydroperoxide, cumene hydroperoxide, azobis(isobutyronitrile) and the like. The catalysts are generally used in amounts of about 0.1 percent to about 5 percent by weight of the mixtures.

The mixtures and catalysts may be heated to cure. Although curing temperatures will vary from monomer to monomer, generally temperatures from about 75° F. to about 300° F. are used to bring about the free-radical cure of the mixtures.

In many instances, it may be desirable to polymerize without the addition of external heat in which cases it is customary to add an accelerator to the system. Suitable accelerators include cobalt salts, such as cobalt octoate or cobalt naphthenate and amine accelerators such as N, N-dimethylmine, N-ethyl-N-hydroxyethyl-m-methylaniline and N-propyl-N-hydroxyethyl-m-methylaniline.

The novel acrylic monomer-polyester mixtures may also be co-cured with various other copolymerizable ethylenically unsaturated monomers or with polymeric materials using the above-described free-radical mechanisms.

The polymers or interpolymers formed by the polymerization of the new mixtures of this invention have great utility as coatings for all types of substrates. They may be used as protective coatings for wood to form panels for walls, as coatings on plastics to form floor tiles, as coatings on metals such as aluminum and steel panels and as coatings for other substrates, and they have the advantage of having superior stain resistance, scratch resistance, mar resistance, weather resistance and chemical resistance (to acids and bases), and the cured coatings have a high degree of crosslinking. These coatings are also relatively flexible and capable of forming strong bonds with various substrates.

The coatings may be formed by applying the mixture to a substrate by any conventional coating means, such as roller coating, curtain coating, brushing, spraying, etc. The coated article may then be cured either by adding peroxide to the coating or by subjecting the coating to actinic light or to ionizing irradiation. It is noted that many of the mixtures have extremely low viscosity, thus insuring easy application if the product is to be used as a coating.

The use of ionizing irradiation to interpolymerize the mixtures is preferred as this method makes it possible to polymerize the coatings at extremely high speeds and thus eliminate the time-consuming baking steps, and as the use of ionizing irradiation requires no heating, the danger of high temperatures damaging a heat-sensitive substrate is eliminated.

It is also noted that the use of ionizing irradiation requires no solvents, thus reducing the danger of poisonous and explosive solvent vapors and that the coatings formed by the use of ionizing irradiation are more highly crosslinked and are generally stronger coatings than the conventionally cured coatings.

The following examples set forth specific embodiments of the instant invention, however the invention is not to be construed as being limited to these embodiments for there are of course, numerous possible variations and modifications. All parts and percentages in the examples as well as throughout the specification are by weight unless otherwise indicated.

EXAMPLE A

A polyester was prepared as follows:

A vessel was charged with 882 grams of maleic anhydride, 1,314 grams of adipic acid, and 1,966 grams of neopentyl glycol. The reactants were heated at temperatures from room temperature to 210° C. for 5½ hours and the polyester had an acid number of 39.8 and a Gardner-Holdt viscosity of C when measured in a 60 percent solution of ethylene glycol-mono-ethyl ether.

The polyester was solubilized in a vinyl monomer by cooling 65 parts of the above polyester to 150° C. and adding 0.1 part of trimethylbenzylammonium chloride, and 0.01 part of methylhydroquinone. The mixture was then cooled to 100° C. and 30 parts of 2-ethylhexyl acrylate were added. The resulting polyester-vinyl monomer mixture was allowed to cool at room temperature.

EXAMPLE B

A polyester was prepared as follows:

A vessel was charged with 1,058.4 grams of maleic anhydride, 1,051.2 grams of adipic acid, and 1,928.1 grams of neopentyl glycol. The reactants were heated at temperatures from room temperature to 210° C. for 8½ hours and the polyester had an acid value of 29.6 and a Gardner-Holdt viscosity of E when measured in a 60 percent solution of ethylene glycol-mono-ethyl ether.

The polyester was solubilized in a vinyl monomer by cooling 65 parts of the above polyester to 150° C. and adding 0.1 part of trimethylbenzylammonium chloride, and 0.01 part of methyl hydroquinone. The mixture was then cooled to 100° C. and 25 parts of 2-ethylhexyl acrylate and 10 parts of diethylene glycol diacrylate were added. The resulting polyester-vinyl monomer mixture was allowed to cool to room temperature.

EXAMPLE C

A polyester was prepared as follows:

A vessel was charged with 1,234.8 grams of maleic anhydride, 788.4 grams of adipic acid, and 1,928.16 grams of neopentyl glycol. The reactants were heated at temperatures from room temperature to 210° C. for 7 hours, and the polyester had an acid number of 33 and a Gardner-Holdt viscosity of F when measured in a 60 percent solution of ethylene glycol-mono-ethyl ether.

The polyester was solubilized in a vinyl monomer by cooling 65 parts of the above polyester to 150° C. and adding 0.1 part of trimethylbenzylammonium chloride, and 0.01 part of methyl hydroquinone. The mixture was then cooled to 100° C. and 30 parts of 2-ethylhexyl acrylate were added. The resulting polyester-vinyl monomer mixture was allowed to cool to room temperature.

EXAMPLE D

A polyester was prepared as follows:

A vessel was charged with 1,568 grams of maleic anhydride, 584 grams of adipic acid, and 2,142 grams of neopentyl glycol. The reactants were heated at temperatures from room temperature to 210° C. for 5 hours and the polyester had an acid number of 37.2 and a Gardner-Holdt viscosity of E+ when measured in a 60 percent solution of ethylene glycol-mono-ethyl ether.

The polyester was solubilized in a vinyl monomer by cooling 65 parts of the above polyester to 150° C. and adding 0.1 part of trimethylbenzylammonium chloride, and 0.01 part of hydroquinone. The mixture was then cooled to 100° C. and 30 parts of 2-ethylhexyl acrylate were added. The resulting polyester-vinyl monomer mixture was allowed to cool to room temperature.

EXAMPLE 1

A copolymer having outstanding physical properties was prepared in the following manner:

A vessel was charged with a mixture of 95 parts of the polyester mixture of Example C and 5 parts of acryloxypivalyl acryloxypivalate having the formula:

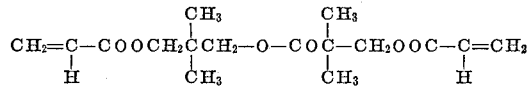

0.1 part of methyl hydroquonine and 0.17 part of trimethylbenzylammonium chloride.

The above mixture of acrylic monomer, polyester and 2-ethylhexyl acrylate is then copolymerized by subjecting it to an electron beam source. The mixture is subjected to electron beam impingement at an accelerating voltage of 400 kilovolts and a tube current of 16 milliamps. The total dosage received is 10 megarads. The resulting copolymer is clear, flexible, and has excellent mar resistance and stain resistance.

EXAMPLE 2

A copolymer having outstanding physical properties was prepared in the following manner:

A vessel was charged with a mixture of 95 parts of the polyester-vinyl monomer mixture of Example C and 5 parts of acryloxypivalyl acryloxypivalate, 0.01 part of methylhydroquinone, and 0.17 part of trimethylbenzylammonium chloride.

The above mixture of acrylic monomer and polyester was then copolymerized by subjecting it to an electron beam source. The mixture was subjected to electron beam impingement at an accelerating voltage of 400 kilovolts and a tube current of 16 milliamps. The total dosage received was 10 megarads. The resulting copolymer was clear, flexible, and had excellent mar resistance and strain resistance.

EXAMPLE 3

A copolymer having outstanding physical properties was prepared in the following manner:

A casting cell was charged with a mixture of 95 parts of the polyester-2-ethylhexyl acrylate mixture of Example A and 5 parts of acryloxypivalyl acryloxypivalate, 0.02 part of methylhydroquinone and 1 part of benzoyl peroxide.

The above mixture of acrylic monomer and polyester was then copolymerized by gelling the mixture at 140° F. and heating for 1 hour at 170° F. and for an additional hour at 250° F. The resulting copolymer was clear, flexible, and had excellent mar resistance and stain resistance.

EXAMPLE 4

A copolymer having outstanding physical properties was prepared in the following manner:

A casting cell was charged with a mixture of 90 parts of the polyester mixture of Example B and 10 parts of acryloxypivalyl acryloxypivalate, 0.02 part of methylhydroquinone and 1 part of benzoyl peroxide.

The above mixture of acrylic monomer and polyester was then copolymerized by gelling the mixture at 140° F., heating the mixture for 1 hour at 170° F. and for an additional hour at 250° F. The resulting copolymer was clear, flexible, and had excellent mar resistance and stain resistance.

EXAMPLE 5

A copolymer having outstanding physical properties was prepared in the following manner:

A casting cell was charged with a mixture of 95 parts of the polyester mixture of Example C, and 5 parts of acryloxypivalyl acryloxypivalate, 0.02 part of methylhydroquinone and 1 part of benzoyl peroxide.

The above mixture of acrylic monomer and polyester was then copolymerized by gelling the mixture at 140° F., heating the mixture for 1 hour at 170° F., and for an additional hour at 250° F. The resulting copolymer was clear, semi-rigid, and had excellent mar resistance and stain resistance.

EXAMPLE 6

A copolymer having outstanding physical properties was prepared in the following manner:

A casting cell was charged with a mixture of 95 parts of the polyester mixture of Example D, and 5 parts of acryloxypivalyl acryloxypivalate, 0.02 part of methylhydroquinone and 1 part of benzoyl peroxide.

The above mixture of acrylic monomer and polyester was then copolymerized by gelling the mixture at 140° F., heating for 1 hour at 170° F., and for an additional hour at 250° F. The resulting copolymer was clear, semi-rigid, and had excellent mar resistance and stain resistance.

EXAMPLES 7–10

A number of copolymers of acryloxypivalyl acryloxypivalate and various polyesters were prepared and the flexibility of the resulting copolymers after radiation of 5 and 10 megarads was tested by the reverse impact test. The flexibility of the polyester extended acrylic compounds were compared to that of the acrylic compound alone.

The reverse impact test is a test of the flexibility and the impact resistance of the coating, and is measured by dropping various weights from various heights onto a ½-inch diameter steel ball positioned on the coating until a failure in the coating arises. The reverse impact is measured by dropping the weight on the ball on the reverse side of the coating. The test results are given in terms of inch pounds, which is a product of the weight in pounds and the distance in inches in which the weight was dropped.

The following table lists the results wherein the control is the acryloxypivalyl acryloxypivalate compound alone. All of the coatings were applied to aluminum panels and subjected to electron beam impingement at an accelerating voltage of 375 kv. and a tube current of 14 ma. and in a nitrogen atmosphere.

TABLE 1

| Example | Maleic acid (moles) | Adipic acid (moles) | Hexahydro-phthalic anhydride (moles) | Neopentyl glycol (moles) | 1,6-hexane diol (moles) | Percent acryloxypivalyl acryloxypivalate | Reverse impact (inch lbs.) 5 mr. | 10 mr. |
|---|---|---|---|---|---|---|---|---|
| 7 | 3 | 7 | | 10.6 | | 50 | 26 | 34 |
| 8 | 4 | 6 | | 10.6 | | 50 | 42 | 38 |
| 9 | 2 | | 8 | | 10.3 | 50 | 50 | 48 |
| 10 | | 6 | | 4 | 10.5 | 75 | 10 | 4 |
| Control | | | | | | 100 | <5 | <5 |

The above tests show the radical increase in reverse impact when the acrylic compound is extended with a polyester.

According to the provisions of the patent statutes, there is described above the invention and what are now considered to be its best embodiments. However, within the scope of the appended claims, it is to be understood that the invention can be practiced otherwise than is specifically described.

We claim:
1. The composition comprising the mixture of
(1) a compound having the general formula

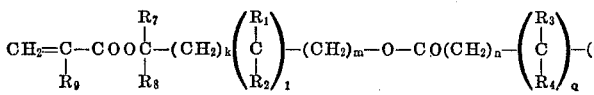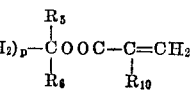

$R_1$, $R_2$, $R_3$, and $R_4$ are selected from the group consisting of H, alkyl, aryl, cycloalkyl, substituted alkyl, substituted aryl and substituted cycloalkyl groups $R_5$, $R_6$, $R_7$ and $R_8$ are selected from the group consisting of H, alkyl, aryl, and cycloalkyl groups $R_9$ and $R_{10}$ are selected from the groups consisting of H, alkyl groups containing from 1 to 2 carbon atoms, halo-substituted alkyl groups containing from 1 to 2 carbon atoms and halogen, and $k$, $l$, $m$, $n$, $p$ and $q$ are numerals having values from 0 to 5 and (2) a polyester which is compatible with compound (1) comprising a reaction product of (a) a polyester of an alpha-beta ethylenically unsaturated polycarboxylic acid and (b) a polyhydric alcohol.

2. The composition of claim 1 wherein the mixture comprises from about 5 percent to about 85 percent by weight of the polyester and from about 5 percent to about 95 percent by weight of the acrylic monomer.

3. The composition of claim 1 wherein compound (1) is acryloxypivalyl acryloxypivalate.

4. The composition of claim 1 wherein compound (1) is methacryloxypivalyl methacryloxypivalate.

5. The composition of claim 1 containing one or other interpolymerizable ethylenically unsaturated monomers.

6. The composition of claim 5 wherein one interpolymerizable ethylenically unsaturated monomer is 2-ethylhexyl acrylate.

7. The composition of claim 5 wherein one interpolymerizable ethylenically unsaturated monomer is styrene.

References Cited
UNITED STATES PATENTS
3,455,802   7/1969   D'Alelio ......... 204—159.19

MELVIN GOLDSTEIN, Primary Examiner

U.S. Cl. X.R.
117—132.13; 204—159.15